United States Patent [19]

Dorbath et al.

[11] Patent Number: 5,252,522
[45] Date of Patent: Oct. 12, 1993

[54] PURPLE PIGMENTS, A PROCESS FOR THEIR PRODUCTION AND USE THEREOF

[75] Inventors: Bernd Dorbath, Alzenau; Karl A. Starz, Rodenbach; Werner Voelker, Bad Vilbel; Wilan Jerke, Niederdorfelden; Kai Dorer, Heusenstamm, all of Fed. Rep. of Germany

[73] Assignee: Degussa Aktiengesellschaft, Frankfurt am Main, Fed. Rep. of Germany

[21] Appl. No.: 843,255

[22] Filed: Feb. 28, 1992

[30] Foreign Application Priority Data

Mar. 1, 1991 [DE] Fed. Rep. of Germany ....... 4106520

[51] Int. Cl.$^5$ ................................................. C03C 8/18
[52] U.S. Cl. ........................................ 501/19; 501/32; 106/403; 427/214; 427/217
[58] Field of Search ................ 501/19, 32; 106/403; 427/214, 217

[56] References Cited

FOREIGN PATENT DOCUMENTS 0162979 12/1985 European Pat. Off. .

OTHER PUBLICATIONS

Patent Abstracts of Japan, vol. 5, No. 35 (C-46) Mar. 5, 1981 & JP-A-55 160 061 (Showa Highpolymer Co.) Dec. 12, 1980.
World Patent Index Latest Derwent Publ. Ltd, Londong, GB Accession No. 89-291098, Week 40 & JP-A-012156865 (Miyoshi Kasei) Aug. 29, 1989.
World Patents Index Latest Derwent Publ. Ltd, London, GB Accession No. 91-146218, Week 20, & JP-A-03084066 (Toray Ind.) Apr. 9, 1991.
World Patents Index Latest Derwent Publ. Ltd, London, GB Acession No. 81-12921D, Week 8, & JP-A-55162473 (Showa High Polymer) Dec. 18, 1980.

*Primary Examiner*—Mark L. Bell
*Assistant Examiner*—Deborah Jones
*Attorney, Agent, or Firm*—Beveridge, DeGrandi, Weilacher & Young

[57] ABSTRACT

Purple pigments based on glass frits having an average particle diameter ($D_{50}$ value) of 0.5 to 50 μm, of which the surface has a coating of essentially 0.05 to 5% by weight, based on the pigment, of colloidal gold and, if desired, color-modifying metals from the group consisting of Ag, Cu, Co, Ni, Sn, Ru, Rh, Pd, Os, Ir and Pt in a total quantity below that of the gold. The purple pigments do not require the hitherto necessary calcination step and can be used for pigmenting glazes, enamels, glass colors, decorative colors, plastics, printing inks and lacquers.

16 Claims, No Drawings

PURPLE PIGMENTS, A PROCESS FOR THEIR PRODUCTION AND USE THEREOF

BACKGROUND OF THE INVENTION

The present invention relates to purple pigments based on glass frits having a coating containing colloidal gold. In a further aspect, the present invention relates to a process for the production of purple pigments and to their use for pigmenting glazes, enamels, decorative colors, glass colors, plastics, printing inks, lacquers and the like.

Purple pigments based on ceramic materials and colloidal gold can be obtained by various methods and have long been used in the production of ceramic decorations and for the pigmenting of plastics, lacquers and decorative colors.

Conventional processes for the production of purple pigments using fine-particle glass as the ceramic binder and colloidal gold as the color-producing component involve several process steps, namely: (a) precipitation of gel-form Cassius's gold purple from aqueous gold salt solutions with reducing agents, such as tin(II) chloride for example, followed by ageing and separation, (b) mixing of the freshly prepared, still moist gold purple with finely ground glass and grinding of the mixture, (c) presintering of the mixture at around 600° to 800° C., the gold particles being at least partly coated with glass, (d) fine grinding of the sintered material and, if necessary, adjustment of the desired color by addition of silver compounds and/or other fluxes.

Serious disadvantages of this process include the fact that separation of the gel-form gold purple from the aqueous solution in step (a) is extremely complicated, the fact that the color of the final pigment is influenced by the ageing of the gold purple in a manner that is difficult to reduce (for example browning in the case of partial drying) and the fact that two grinding steps which reduce the volume/time yield and an energy-intensive sintering step are required. In addition, the non-uniformity of the pigments thus obtained is visible under a microscope.

There has been no shortage of attempts to improve the process briefly described above. By precipitation of the gold purple in the presence of substances which form oxide hydrates, such as Al and Sn salts, is it possible to obtain more readily filterable co-precipitates of colloidal gold and the oxide hydrates, in addition to which the color of the co-precipitates is more reproducible and resistant to ageing. However, the other steps involved in the production process correspond to steps (b), (c) and (d) mentioned above, cf. for example RO Patent 64442 B (Chemical Abstracts 98 (26): 22 07 40e), so that the overall cost of the process is again considerable. Apart from this, the pigment is not uniform and the presence of the oxide can adversely affect the brilliance of the pigment and/or the properties of glazes, enamels, glass and decorative colors containing such pigments.

According to DD-PS 143 423, precipitation of the gold purple can also be carried out in the presence of inert material. The purple-colored moist deposit is then homogeneously mixed with a glass flux and, for color control, with silver carbonate and the resulting mixture is wet-ground, sintered at 650°–680° C. and re-ground. The purple pigments obtained by this process are also attended by the above-mentioned quality disadvantages.

Purple-coated pearlescent pigments based on platelet-like particles coated with metal oxides, such as in particular $TiO_2$-coated mica, with an optically semitransparent layer of gold (cf. DE-PS 32 29 837, DE-OS 38 25 702) or a surface layer of tin oxide in which colloidal gold is incorporated (DE-OS 37 31 174) are commercially available. In these materials, the gold coating is always situated on a metal oxide layer which first has to be applied to the platelet-like substrate (besides mica, glass is also mentioned). In no case is a particulate glass directly surface-coated with colloidal gold. The presence of a metal oxide layer beneath a gold-containing coating is clearly regarded as necessary. However, application of a metal oxide layer is complicated because coating with gold has to be preceded by a calcination step to convert oxide hydrates into oxides.

In addition, the metal oxides can adversely affect the quality of the pigment and its performance properties.

SUMMARY OF THE INVENTION

Accordingly, an object of the present invention was to provide new purple pigments based on finely-divided particulate glass, such as especially glass frits, having a coating containing colloidal gold which is distinguished by high brilliance and outstanding performance properties in regard to compatibility with the ceramic substrates to be decorated. The pigments would be readily adaptable to the particular substrates. In addition, the color of the new purple pigments would readily be controllable during their production.

Another object of the present invention was to provide a process for the production of the new purple pigments which is distinguished from known processes for the production of know purple pigments by the fact that it could be carried out more easily, i.e. in fewer process steps, and would not involve a calcination step.

Applicants have found purple pigments which are characterized in that the coating essentially contains colloidal gold in a quantity of 0.05 to 5% by weight, based on the pigment, and optionally, one or more color-modifying metals selected from the group consisting of Ag, Cu, Co, Ni, Sn, Ru, Rh, Pd, Os, Ir and Pt. The total quantity of the color-modifying metal is below that of the gold and is directly applied to the surface of glass frits of which the particle diameter ($D_{50}$ value) is in the range from 0.5 to 50 µm.

The pigments of the present invention are free of the intermediate metal oxide coating found in the prior art and therefore are defined as being the gold/color modifying metal directly bonded to the surface of the glass frit.

In addition to the metals mentioned, the coating may contain additional substances emanating from the coating process, such as oxides for example, in small quantities of less than 20% by weight, based on the total content of metals. In a preferred embodiment, the coating consists solely of the colloidal gold and, if desired, the color-modifying metals.

The color intensity of the pigments is determined by the quantity of gold. In most cases, quantities of 0.1 to 2% by weight and, more particularly, 0.1 to 1% by weight colloidal gold, based on the pigment, are sufficient. The color-modifying metal elements may have been deposited on the glass frit either together with the gold or in a separate step. The metals are essentially deposited on the glass frit in the form of a thin layer consisting of one or more atomic layers in such a form that the pigment particles are at least partly optically transparent.

Preferred purple pigments have a coating which consists solely of colloidal gold and silver. The color of silver-free purple pigments is tinged with violet while the color of silver-containing purple pigments is tinged more with red with increasing silver content. When present, the silver content of these pigments is generally up to 50% and preferably up to 25% of the gold content.

DETAILED DESCRIPTION OF THE INVENTION

Finely ground glass frits are used as support material for the purple pigments. Glass frits of different chemical composition can be obtained by fusing suitable glass raw materials, quenching the glass melt in water and grinding the granules or flakes obtained. In the case of pigments, the average particle diameter, the so-called $D_{50}$ value, is generally between about 0.5 and 50 $\mu$m, although glass frits having a $D_{50}$ value of 1 to 10 $\mu$m are preferably used. The $D_{50}$ value may be determine by known granulometer analyses.

As is known in the art, the composition of the frits has a crucial influence on their softening behavior, thermal expansion coefficient and specific color development which, in the ceramic industry, is understood to be the interaction between a pigment and a frit during firing. By selecting the glass frit from a broad commercially available range, it is possible for a person skilled in the art to base the purple pigments according to the invention on a glass frit the properties of which correspond completely or at least partly to those of frits commonly used in the decoration process being carried out and adapted to the specific substrate to be decorated. Frequently the glass frits are from the broad group of alkali metal aluminosilicates. Borosilicates are a subtype in this large family of glasses, as are lead silicate glasses. Some of the examples herein illustrate the lead borosilicate glass frits that can be used. Defects in the ceramic decoration, such as flaking, flaws and opacity, are thus avoided. Therefore, it is within the competence of the skilled person in this art to select a commercially available glass frit for matching with the intended purpose, as for example, the decorations of a ceramic. Factors to be taken into consideration by the skilled person would be softening point relative to the surface to be decorated, matching of the coefficients of thermal expansion, adhesion properties and the like.

The purple pigments according to the invention can be obtained by a single-stage and, in rare cases, two-stage coating process. The calcination and sintering process at temperatures above about 600° C. required in the case of known purple pigments and the subsequent grinding process are unnecessary in the process according to the invention. The process according to the invention avoids calcination and sintering and is characterized in that colloidal gold in a quantity of 0.05 to 5% by weight, based on the pigment, and—if desired—one or more color-modifying metals from the group consisting of Ag, Cu, Co, Ni, Sn, Ru, Rh, Pd, Os, Ir and Pt in a total quantity below that of the gold are deposited on the surface of an uncoated glass frit. That is the coating is directly adjacent the glass frit surface with no intermediate metal oxide layer. The average particle diameter ($D_{50}$ value) of the glass frit is in the range from 0.5 to 50 $\mu$m. The metals to be directly deposited in the glass frit are in the form of water-soluble compounds of gold and, where present, the color-modifying metals and are in the presence of reducing agents in an aqueous suspension containing the glass frit. The pigment thus obtained is separated from the aqueous phase by conventional methods. Thereafter the pigment can be dried and is ready for use.

In cases where color-modifying metals are to be deposited in addition to the gold, this may be done either simultaneously or in succession with the gold. A suitable reducing agent may be used for the deposition of all metals, which is preferred in the case of silver-modified purple pigments, or alternatively two different reducing agents may optionally be used, one for precipitation of the gold, and the other for precipitation of the color-modifying metal(s).

Suitable reducing agents for the deposition of colloidal gold and color-modifying metals essentially on the surface of the frit include reducing agents which are active in aqueous media, for example aldehydes, such as formaldehyde and acetaldehyde, tartaric acid, ascorbic acid, reductones, reducing sugars, such as glucose, glycols, polyphenols, sulfites, dithionites, hypophosphites, hydrazine, metal hydrides, complex hydrides, tin(II) salts and hydrogen. Particularly suitable reducing agents are formaldehyde, tartrates and glucose, with which gold and silver can be deposited without difficulty. To carry out the coating process, the gold solution and, accordingly, the color-modifying metal salt solution are preferably added to the aqueous suspension containing the frit and the reducing agent and adjusted to the necessary pH value with stirring at a temperature of 5° to 100° C.

In principle, however, the reducing agent may also be added to a suspension containing the metal compound and the glass frit. If desired, the actual coating step may be preceded by so-called surface activation of the glass frit in which the glass frits is first treated with an aqueous $SnCl_2$ solution and is then washed. Where silver is used in the coating solution, the color changes from violet-tinged—without silver—to red-tinged—with silver.

As mentioned above, the purple pigments according to the invention may be used for the pigmenting of glazes, enamels, plastics, glass and decorative colors, lacquers and printing inks and hence for the production of decorative colors.

Purple pigments specially adapted to the particular application may be used, i.e., pigments based on low-melting frits for glass colors, and pigments based on relatively high-melting frits for porcelain colors and quick-fire colors and colors for wall tiles. The fact that the pigment is adapted to the glass frits of the glazes and enamels does not affect the flow behavior of the glazes and enamels during firing. Whereas known gold-containing purple pigments which contain aluminum oxide particles in addition to glass particles are not sufficiently color-stable at temperatures around 1,100° C., the purple pigments according to the invention are suitable for the rapid firing of porcelain at high temperatures. In addition, the known pigments mentioned above often led to opaque and dull decorations whereas the use of the purple pigments according to the invention enables transparent and hence brilliant decorations to be produced. Since, in the ceramic field, the frits of the pigments according to the invention are largely coordinated with those of the glazes and enamels, there are no unexpected changes in color. The use of color-modifying metals in the production of the pigments eliminates the need for subsequent color modification by the addition of, for example, silver carbonate to the decorative color.

It was not foreseeable that the gold-containing purple pigments would be able to be produced by the described process, which is considerably simplified in relation to the processes used for producing known purple pigments, would be completely uniform and would show the advantageous performance properties mentioned in the foregoing.

In actual decorating processes, the pigment is deposited in accordance with the desired pattern and is fired for adhesion to the substrate to be decorated.

The invention is illustrated by the following Examples.

EXAMPLES

Example 1

Coating of a glass frit with 0.5% by weight gold

The glass frit used contains as its principal constituents PbO, $SiO_2$, $Al_2O_3$, $SnO_2$, $B_2O_3$ and alkali oxide: particle size distribution: 90% <8 µm. For coating, 50 g of the glass frit are kept suspended by stirring in a solution of 350 ml water and 25 g D-glucose. The pH value of the reaction mixture is increased with ammonia from 5.5 to 11, after which a clear solution of 0.5 g $AuCl_4 \cdot H_2O$ (=0.25 g Au) in 50 ml water is added all at once at around 25° C. After this addition, the reaction mixture is stirred in the absence of heat. After a reaction time of about 20 minutes, the reaction mixture undergoes a change in color. After 120 minutes, reduction is complete. When the stirrer is switched off, the particles immediately sediment. A clear filtrate is formed above the sediment. The purple-colored pigment is filtered off under suction, washed with water and ethanol and dried at 100° C.

Example 2

Coating of a glass frit with 2% by weight gold

The lead borosilicate frit used has a particle size distribution of 90% <9 µm. An activating solution is initially prepared. To this end, 10 g NaOH pellets are dissolved in 100 ml water. 10 g $SnCl_2 \cdot H_2O$ are added to the resulting solution. A clear solution is rapidly formed with stirring.

50 g glass frit are treated with this activating solution for 20 minutes, followed by filtration of the suspension under suction and washing with water. The activated glass frit is introduced into a solution of 350 ml water and 2 g $H(AuCl_4) \cdot H_2O$ (=1 g Au). This solution is heated to 60° C. and the glass particles are kept suspended by stirring. A solution of 75 g Rochelle salt in 100 ml water is added to the reaction mixture heated to 60° C. After about 30 minutes, reduction is complete and the purple-colored pigment can be filtered off under suction and washed with water. The material is dried at 100° C. in a drying cabinet.

Example 3

Coating of a glass frit with 5% by weight gold

The glass frit used contains $SiO_2$, PbO, $Al_2O_3$, $B_2O_3$ and alkali oxide. It has a particle size distribution of 90% <12 µm. 50 g of the glass frit are added to a solution of 75 g ascorbic acid in 350 ml water. The reaction mixture is vigorously stirred so that the particles do not form a sediment. A solution of 5 g $HAuCl_4 \cdot H_2O$ (=2.5 g Au) in 100 ml water is then added to the mixture at room temperature. The reaction mixture as a whole is then slowly heated. The heating rate should be about 10° C. per 10 minutes. After 30 minutes, the reaction is complete and the pigment can be filtered off under suction, washed and dried.

Example 4

Coating of a high-temperature quick-fire (HTQ) frit with 0.5% by weight gold and, at the same time, with 0.1% by weight silver The HTQ frit is composed of $SiO_2$, PbO, $B_2O_3$, $Al_2O_3$, CaO and alkali oxide and has a particle size distribution of 90% <15 µm. 50 g HTQ frit are added to a solution of 50 g D-glucose in 350 ml water. The pH value of the solution is increased from 5.5 to 11 with ammonia. The reaction mixture is stirred so vigorously that the particles are kept in suspension in the solution. A solution of 0.5 g $H(AuCl_4) \cdot H_2O$ in 50 ml water and a solution of 0.08 g $AgNO_3$ (=0.05% Ag) in 50 ml water are then successively added. The reaction mixture is stirred for 2 hours at room temperature, after which the pigment is filtered off, washed and dried at 100° C.

Example 5

Coating of a glass frit with 0.5% by weight gold and 0.1% by weight silver

The glass frit used is a lead-free glass frit containing $B_2O_3$, $SiO_2$, $Na_2O$ and $Al_2O_3$ as its principal constituents. The glass frit has a particle size distribution of 90% <5 µm. 50 g glass flux are suspended in a solution of 50 g D-glucose in 350 ml water. The pH value of the solution is increased from 6 to 11 with ammonia. The reaction mixture is stirred so vigorously that the glass particles are unable to settle to form a sediment. The temperature of the reaction mixture should be approximately 25° C. A gold solution of 0.5 g $H(AuCl_4) \cdot H_2O$ and 50 ml water is added to the reaction mixture which is then left to react until it undergoes a change in color. A solution of 0.08 g $AgNO_3$ in 50 ml water is then added, followed by reaction for another 2 hours at room temperature. The pigment is then filtered off under suction, washed and dried at 100° C.

|  | Example No. | | | | |
| --- | --- | --- | --- | --- | --- |
|  | 1 | 2 | 3 | 4 | 5 |
| Commercially Available Frits |  |  |  |  |  |
| Prod.-No. of DEGUSSA AG | 10126 | 10140 | 10138 | 90015 | 10150 |
| PbO-Content (wt.-%) | 42 | 41 | 33 | 21 | 0 |

*The preferred embodiment for a frit of lead free purple pigment is exemplified. Other lead free frits can also be used, such as are shown in EP-A 0 267 154, U.S. Pat. No. 4,315,778, U.S. Pat. No. 4,446,241, U.S. Pat. No. 4,537,862, EP-A 0 347 379, and EP-A 0 321 287.

Further variations and modifications of the foregoing will be readily apparent to those skilled in the art and are intended to be encompassed by the claims appended hereto.

German priority document P 41 06 520.4 is relied on and incorporated herein by reference.

We claim:

1. A purple pigment comprising a glass frit having a particle diameter ($D_{50}$ value) in the range from 0.5 to 50 µm, and a coating on said glass frit, said coating consisting essentially of colloidal gold in a quantity of 0.05 to 5% by weight, based on the pigment, and optionally, one or more color-modifying metals selected from the group consisting of Ag, Cu, Co, Ni, Sn, Ru, Rh, Pd, Os, Ir and Pt wherein the total quantity of said metal is below the quantity of said gold, said coating being directly applied to the surface of said glass frit.

2. The purple pigment as claimed in claim 1, wherein the pigment contains 0.1 to 2% by weight colloidal gold.

3. The purple pigment as claimed in claim 1, wherein the coating consists solely of colloidal gold.

4. A purple pigment, comprising a glass frit having a particle diameter ($D_{50}$ value) in the range from 0.5 to 50 μm, and a coating on said glass frit, said coating consisting essentially of colloidal gold in a quantity of 0.05 to 5% by weight, based on the pigment, and a color-modifying metal which is silver wherein the total quantity of silver is below the quantity of said gold.

5. The purple pigment as claimed in claim 1, wherein the color-modifying metal is present in sufficient amount to form a pigment particle that is at least partly optically transparent.

6. The purple pigment as claimed in claim 4, wherein the silver content is up to 50% of the gold content.

7. The purple pigment as claimed in claim 4, wherein the glass frit has a $D_{50}$ value in the range from 1 to 10 μm.

8. The purple pigment as claimed in claim 4 wherein the glass frit is lead free.

9. The purple pigment as claimed in claim 1 wherein the pigment is free of a metal oxide intermediate layer and the said coating is immediately adjacent the surface of said glass frit.

10. The purple pigment as claim in claim 1 wherein the glass frit is an aluminosilicate glass.

11. The purple pigment as claimed in claim 1 wherein the glass frit is a lead borosilicate glass.

12. A process for the production of a purple pigment comprising a glass frit of which the average particle diameter ($D_{50}$ value) is in the range from 0.5 to 50 μm, having a coating containing colloidal gold in a quantity of 0.05 to 5.0% by weight, based on the pigment, and optionally, one or more color-modifying metals selected from the group consisting of Ag, Cu, Co, Ni, Sn, Ru, Rh, Pd, Os, Ir and Pt, wherein the total quantity of said metal is below that of said gold, said process comprising depositing on the surface of an uncoated glass frit a water-soluble compound of gold, and where present, the color-modifying metal in the presence of a reducing agent in an aqueous suspension containing the glass frit, separating the pigment thus obtained from the aqueous phase and drying the pigment.

13. The process as claimed in claim 12, wherein the silver is used as the color-modifying metal and the gold and silver are deposited simultaneously or successively using the same reducing agent.

14. The process as claimed in claim 12, wherein the glass frit is first treated with a suitable reducing agent for the gold prior to depositing said soluble compound of gold.

15. The process as claimed in claim 12, wherein the glass frit is first treated with a suitable reducing component for the said metal prior to depositing said soluble compound of gold.

16. A process for the production of a purple pigment comprising a glass frit of which the average particle diameter ($D_{50}$ value) is in the range from 0.05 to 50 μm, having a coating containing colloidal gold in a quantity of 0.05 to 5.0% by weight, based on the pigment, and a color-modifying metal which is silver wherein the total quantity of silver is below that of said gold, said process comprising depositing on the surface of an uncoated glass frit a water-soluble compound of gold, and the color-modifying silver in the presence of a reducing agent in an aqueous suspension containing the glass frit, separating the pigment thus obtained from the aqueous phase and drying the pigment.

* * * * *